Patented June 22, 1948

2,443,630

UNITED STATES PATENT OFFICE 2,443,630

FLUORINATION OF CARBON TETRACHLORIDE

Earl T. McBee and Zara D. Welch, La Fayette, Ind., assignors to Purdue Research Foundation, West Lafayette, Ind., a corporation of Indiana No Drawing. Application August 10, 1943, Serial No. 498,093

6 Claims. (Cl. 260—653)

This invention relates to a process for the fluorination of carbon tetrachloride and more particularly to a continuous process for the fluorination thereof with hydrogen fluoride.

It has been shown that carbon tetrachloride or other bromo- or chloro hydrocarbons may be fluorinated with hydrogen fluoride under certain conditions and under the influence of certain catalysts with the replacement of one or more of the halogen atoms with fluorine. The fluorine-containing compounds so produced have found wide utility as refrigerants, solvents, as carriers for insecticides, and are otherwise important commercially.

The catalysts employed in carrying out such fluorination reactions usually comprise a compound of antimony, such as antimony pentachloride, or a heavy metal halide. The use of these catalysts, however, involves certain inherent disadvantages. Thus the use of antimony trifluoride as a catalyst renders the process expensive to operate, both as regards the cost of the catalyst itself and the equipment required to handle it. Losses of the catalyst occur due to its relatively high vapor pressure and this lost material must be replaced with additional catalyst. The use of a metal halide catalyst usually leads to substantial decomposition of the organic compounds present in the reacting mixture and fouling of the catalyst with products of the decomposition so that the catalyst must be renewed frequently. The metal halide also absorbs water and must be regenerated.

We have found that carbon tetrachloride may be fluorinated readily and directly by heating it in admixture with hydrogen fluoride at a temperature of 300° centigrade or higher under a pressure of 750 pounds per square inch or higher. The reaction proceeds rapidly without the aid of a catalyst and the fluoro-chloro-methanes are formed in high yield and may be recovered and purified readily. Little or no decomposition of the organic components of the reacting mixture occurs, and the process is adapted to continuous operation. The reaction product, which is gaseous at ordinary temperatures, may, if desired, be washed with water and/or an aqueous alkali, such as sodium hydroxide, milk of lime, or the like, to absorb the hydrogen chloride formed during the raction, together with any unreacted hydrogen fluoride, and the washed mixture may then be condensed and fractionally distilled. In this way there may be obtained fractions consisting of monofluoro-trichloro-methane and of difluoro-dichloro-methane.

By adjusting the reaction conditions, as will be hereinafter explained fully, a high proportion of either monofluoro-trichloro-methane or of difluoro-dichloro-methane may be obtained in the products. When difluoro-dichloro-methane is the principal desired product, the reaction may be carried out to advantage in two stages. Thus, for example, carbon tetrachloride may be fluorinated in a first stage reactor with the production of monofluoro compound in high yield and the latter then fluorinated further in a second stage, with the production of a large proportion of difluoro-dichloro-methane in the reaction product.

It is preferable in the operation of the two-stage process to separate the monofluoro-trichloro-methane from the reaction mixture after the 1st stage of the reaction and then mix it with an additional quantity of hydrogen fluoride prior to the second stage. Alternatively, the additional hydrogen fluoride may be added directly to the reaction mixture from the first stage of the reaction without separation therefrom of the monofluoro-trichloro-methane, or the whole of the hydrogen fluoride may be added to the carbon tetrachloride prior to the first stage of the reaction and the mixture then conducted through the reaction zone. In either case, the reaction may, if desired, be carried out in a first and a second zone maintained at different temperatures or the reaction mixture may be passed through a reaction zone, maintained at a substantially constant temperature, at such a rate that the contact time is greater than that required for production of monofluoro-trichloro-methane.

The reaction may be carried out at a temperature above about 300° centigrade and preferably at a temperature between 350° and 500° centigrade. The reactants may be heated separately, if desired, and then mixed in the reaction zone or they may be mixed prior to being heated and thereafter passed through the reaction zone. The pressure in the reaction zone is maintained above about 750 pounds per square inch guage, usually between 750 and 3000 pounds per square inch, and preferably between 750 and 1250 pounds per square inch. The pressure in the reaction vessel may be maintained by continuously pumping the reactants, either separately or mixed, into the vessel at the desired rate and venting the reaction products continuously from the vessel at such a rate as to maintain the desired pressure therein. Any convenient form of reaction vessel may be used, such as a nickel-lined iron pressure vessel of elongated shape in which channelling is avoided.

The length of time during which the mixture is subjected to the reaction temperature is controlled by the size of the vessel and the speed with which the mixture is conducted through the vessel. The reaction time may be expressed conveniently in terms of the space velocity of the carbon tetrachloride within the reaction zone. Such space velocity may be defined as the number of gram moles of carbon tetrachloride passing through the reaction vessel per hour per liter of reaction zone. In case the reaction is carried out in two stages as mentioned previously, the reaction period of the second stage may be described in terms of the space velocity of the monofluoro-trichloro-methane through the zone wherein the second stage of the reaction occurs.

The space velocity of the carbon tetrachloride through the reaction zone is usually maintained at less than 30 gram moles per hour per liter and preferably between 5 and 15 gram moles per hour per liter. In the case of a two-stage reaction wherein difluoro-dichloro-methane is the desired product, the first step of the reaction may be conveniently carried out at a space velocity of carbon tetrachloride of less than 15 gram moles per hour per liter, and the second step may be carried out at a space velocity of the monofluoro-trichloro-methane of less than 10 gram moles per hour per liter.

The proportions of reactants may be varied over wide limits depending upon whether it is desired to utilize as much as possible of the hydrogen fluoride or to produce a maximum amount of fluorinated product per unit of reactor space. It is apparent that for each chlorine atom replaced in one mole of carbon tetrachloride one mole of hydrogen fluoride will be utilized. Consequently, it is usually preferred to operate the process using not less than one mole of hydrogen fluoride for each mole of carbon tetrachloride, although it is understood that in certain instances wherein it is desired to keep the amount of hydrogen fluoride in the reacted mixture low, somewhat less than one mole of hydrogen fluoride may be used for each mole of carbon tetrachloride. Little advantage is gained by using a total of more than 6 moles of hydrogen fluoride for each mole of carbon tetrachloride. When the reaction is carried out in two stages to produce difluoro-dichloro-methane the mole ratio of hydrogen fluoride to monofluoro-trichloro-methane used in the second stage of the reaction is usually between about 3 and about 6, although as low as one mole of hydrogen fluoride may be used. It is apparent also, that when the reaction is carried out in one stage with the preparation of difluoro-dichloro-methane as the principal product, considerably more than one mole of hydrogen fluoride should be used for each mole of carbon tetrachloride.

Certain advantages of the invention may be seen from the following examples which are, however, given merely by way of illustration and are not to be construed as limiting.

EXAMPLE 1

Preparation of monofluoro-trichloro-methane

Anhydrous hydrogen fluoride and carbon tetrachloride were each preheated to about 450° centigrade and then pumped simultaneously, and at a fixed mole ratio of hydrogen fluoride to carbon tetrachloride of about 1.0 into a nickel-lined pressure vessel maintained at a temperature of about 450° centigrade. The reaction products were vented from the reaction vessel at about 1000 pounds per square inch. The reaction vessel had a volume of 1050 cubic centimeters and the flow of reactants therethrough was at the rate of 15.3 gram moles of hydrogen fluoride and 14.7 gram moles of carbon tetrachloride per hour. The vented gaseous reaction products were scrubbed with dilute sodium hydroxide solution to remove hydrogen chloride and any unreacted hydrogen fluoride. The washed gaseous mixture was dried by passing it through a tube packed with anhydrous calcium sulfate and condensed in a receiver cooled with a mixture of solid carbon dioxide and trichloroethylene.

A sample of the condensate, collected over a period of 10.6 minutes, was saved for analysis. During this time 2.6 moles of carbon tetrachloride and 2.7 moles of hydrogen fluoride were pumped into the reaction vessel. The washed, dried, and condensed reaction product which was so obtained consisted of 0.4 mole of unreacted carbon tetrachloride, 1.76 moles of monofluoro-trichloro-methane, and 0.11 mole of difluoro-dichloro-methane. There were thus obtained a 67.7 per cent conversion of the carbon tetrachloride to monofluoro-trichloro-methane, a 4.2 per cent conversion to difluoro-dichloro-methane, and a recovery of 15.4 per cent of carbon tetrachloride. Mechanical losses amounted to about 12.7 per cent of the carbon tetrachloride, there being substantially no decomposition thereof in the reaction chamber. The yield of monofluoro-trichloro-methane, based on the amount of carbon tetrachloride consumed, was 80.0 per cent.

EXAMPLE 2

Preparation of monofluoro-trichloro-methane

In the second preparation of monofluoro-trichloro-methane in the same apparatus used in Example 1, the hydrogen fluoride and carbon tetrachloride were pumped into the reactor at the respective rates of 28.1 and 5.9 gram moles per hour. The reaction temperature and pressure were maintained at 395° centigrade and 3000 pounds per square inch respectively. The mole ratio of hydrogen fluoride to carbon tetrachloride was 4.7. The washed and dried reaction product, collected over a period of 26.3 minutes, during which period 12.3 moles of hydrogen fluoride and 2.6 moles of carbon tetrachloride were pumped into the reaction vessel, was fractionally distilled. Three fractions were collected, consisting respectively of 0.09 mole of difluoro-dichloro-methane, 2.15 moles of monofluoro-trichloro-methane, and 0.16 mole of unreacted carbon tetrachloride. The yield of monofluoro-trichloro-methane based on the carbon tetrachloride consumed was 88.1 per cent.

EXAMPLE 3

Preparation of difluoro-dichloro-methane

Monofluoro-trichloro-methane, prepared and recovered according to the method of Example 1, was fluorinated with hydrogen fluoride in the same apparatus used in Example 1. A mixture of 9.5 gram moles of monofluoro-trichloro-methane and 41.5 gram moles of anhydrous hydrogen fluoride was passed through the reaction vessel every hour. The reaction temperature was maintained at 420° centigrade and the pressure at 1000 pounds per square inch. The reaction product obtained over a period of 14.2 minutes, during which period 2.25 moles of monofluoro-trichloro-methane and 9.8 moles of hydrogen fluoride were pumped into the reaction vessel, was washed, dried, and fractionally distilled as in Example 1. There were thus obtained 1.81 moles of difluoro-dichloro-methane and 0.26 mole of unreacted monofluoro-trichloro-methane. The yield of difluoro-dichloro-methane, based on the mono-fluoro-trichloro-methane consumed was 90.5 per cent.

EXAMPLE 4
*Preparation of difluoro-dichloro-methane*

Difluoro-dichloro-methane was prepared by fluorinating carbon tetrachloride in the same apparatus as used in Example 1. Carbon tetrachloride and hydrogen fluoride were conducted through the reaction chamber at the rate of 8.3 and 18.7 moles per hour, respectively. The reaction temperature was maintained at 460° centigrade and the pressure at 1000 pounds per square inch. The reaction product collected over a period of 18.9 minutes, during which time 2.6 moles of carbon tetrachloride and 5.9 moles of hydrogen fluoride were pumped into the reaction vessel, was washed with dilute sodium hydroxide and dried. The dried gaseous mixture was condensed and fractionally distilled. There were thus obtained 0.75 mole of difluoro-dichloro-methane, 1.32 moles of monofluoro-trichloro-methane and 0.16 mole of unreacted carbon tetrachloride. The yields of difluoro-dichloro-methane and of monofluoro-dichloro-methane, based upon the carbon tetrachloride consumed, were 30.8 and 54.1 per cent, respectively.

We claim:

1. The method which includes passing a compound selected from the group consisting of carbon tetrachloride and trichloromonofluoromethane, and hydrogen fluoride under a pressure above about 750 pounds per square inch into a reaction zone maintained at a temperature above 300° centigrade and under a pressure above about 750 pounds per square inch.

2. In a method for the preparation of a chlorofluoromethane, the step of passing carbon tetrachloride and hydrogen fluoride under a pressure above about 750 pounds per square inch into a reaction zone maintained at a temperature above about 350° centigrade and under a pressure above about 750 pounds per square inch.

3. In a method for the preparation of a chlorofloromethane, containing more fluorine atoms than the starting chlorofluoromethane, the step of passing trichloromonofluoromethane and hydrogen fluoride under a pressure above about 750 pounds per square inch into a reaction zone maintained at a temperature above about 350° centigrade and under a pressure above about 750 pounds per square inch.

4. The method which includes: introducing a compound selected from the group consisting of carbon tetrachloride and trichloromonofluoromethane, and hydrogen fluoride, under a pressure greater than that pressure maintained in the reaction zone, into a reaction zone maintained at a temperature between about 350° and 500° centigrade and under a pressure between about 750 and about 1250 pounds per square inch.

5. The process as claimed in claim 4, wherein the space velocity of the methane reactant is not greater than 30 moles per hour per liter of reaction zone.

6. The process of claim 4, wherein the space velocity of the methane reactant is not in excess of about 15 moles per hour per liter of reaction zone.

EARL T. McBEE.
ZARA D. WELCH.

REFERENCES CITED

The following references are of record in the file of this patent:

UNITED STATES PATENTS

| Number | Name | Date |
|---|---|---|
| 1,961,622 | Nutting et al. | June 5, 1934 |
| 2,005,706 | Daudt et al. | June 18, 1935 |
| 2,005,708 | Daudt et al. | June 18, 1935 |
| 2,110,369 | Leicester | Mar. 8, 1938 |

FOREIGN PATENTS

| Number | Country | Date |
|---|---|---|
| 670,130 | Germany | Jan. 12, 1939 |